United States Patent
Arndt et al.

(10) Patent No.: US 7,873,751 B2
(45) Date of Patent: *Jan. 18, 2011

(54) INFINIBAND MULTICAST OPERATION IN AN LPAR ENVIRONMENT

(75) Inventors: Richard Louis Arndt, Austin, TX (US); Bruce Leroy Beukema, Hayfield, MN (US); David F. Craddock, New Paltz, NY (US); Ronald Edward Fuhs, Rochester, MN (US); Thomas Anthony Gregg, Highland, NY (US); Calvin Charles Paynton, Byron, MN (US); Steven L. Rogers, Rochester, MN (US); Donald William Schmidt, Stone Ridge, NY (US); Bruce Marshall Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 373 days.

This patent is subject to a terminal disclaimer.

(21) Appl. No.: 12/166,713

(22) Filed: Jul. 2, 2008

(65) Prior Publication Data

US 2008/0267183 A1    Oct. 30, 2008

Related U.S. Application Data

(63) Continuation of application No. 10/718,299, filed on Nov. 20, 2003, now Pat. No. 7,428,598.

(51) Int. Cl.
  G06F 15/16 (2006.01)
(52) U.S. Cl. ............... 709/250; 709/230; 709/236; 709/238; 370/389
(58) Field of Classification Search ............... 709/230, 709/236, 237, 238, 250; 370/389, 390
See application file for complete search history.

(56) References Cited

U.S. PATENT DOCUMENTS

| | | | |
|---|---|---|---|
| 6,480,500 B1 | 11/2002 | Erimli et al. | |
| 7,010,607 B1 | 3/2006 | Bunton | |
| 7,116,673 B2 | 10/2006 | Kashyap et al. | |
| 7,190,667 B2 | 3/2007 | Susnow et al. | |
| 7,210,056 B2 | 4/2007 | Sandven et al. | |
| 7,221,676 B2 | 5/2007 | Green et al. | |
| 7,307,996 B2 | 12/2007 | Forbes et al. | |
| 7,428,598 B2 * | 9/2008 | Arndt et al. ................ | 709/250 |
| 2002/0159456 A1 | 10/2002 | Foster et al. | |
| 2002/0198927 A1 | 12/2002 | Craddock et al. | |
| 2003/0031183 A1 | 2/2003 | Kashyap et al. | |
| 2003/0033426 A1 | 2/2003 | Beukema et al. | |
| 2003/0103504 A1 | 6/2003 | Dugan et al. | |
| 2003/0206548 A1 | 11/2003 | Bannai et al. | |
| 2003/0226085 A1 | 12/2003 | Tucker | |
| 2003/0236900 A1 | 12/2003 | Chu | |
| 2004/0024903 A1 | 2/2004 | Costatino et al. | |

* cited by examiner

OTHER PUBLICATIONS

Inifiniband Trade Association, "Infiniband Architecture Specification Volume 1", Nov. 2002, Release 1.1. http://www.infinibandta.org/specs/register/publicspec.

*Primary Examiner*—Ramy M Osman
(74) *Attorney, Agent, or Firm*—Yee & Associates, P.C.; Matthew W. Baca

(57) ABSTRACT

A method, computer program product, and data processing system for providing system-area network (SAN) multicasting functionality in a logically partitioned (LPAR) data processing system in which a channel adapter is shared among a plurality of logical partitions is disclosed. A preferred embodiment of the present invention allows LPAR "hypervisor" firmware to assume the responsibility for multicast protocol handling and distribution of packets among logical partitions.

12 Claims, 8 Drawing Sheets

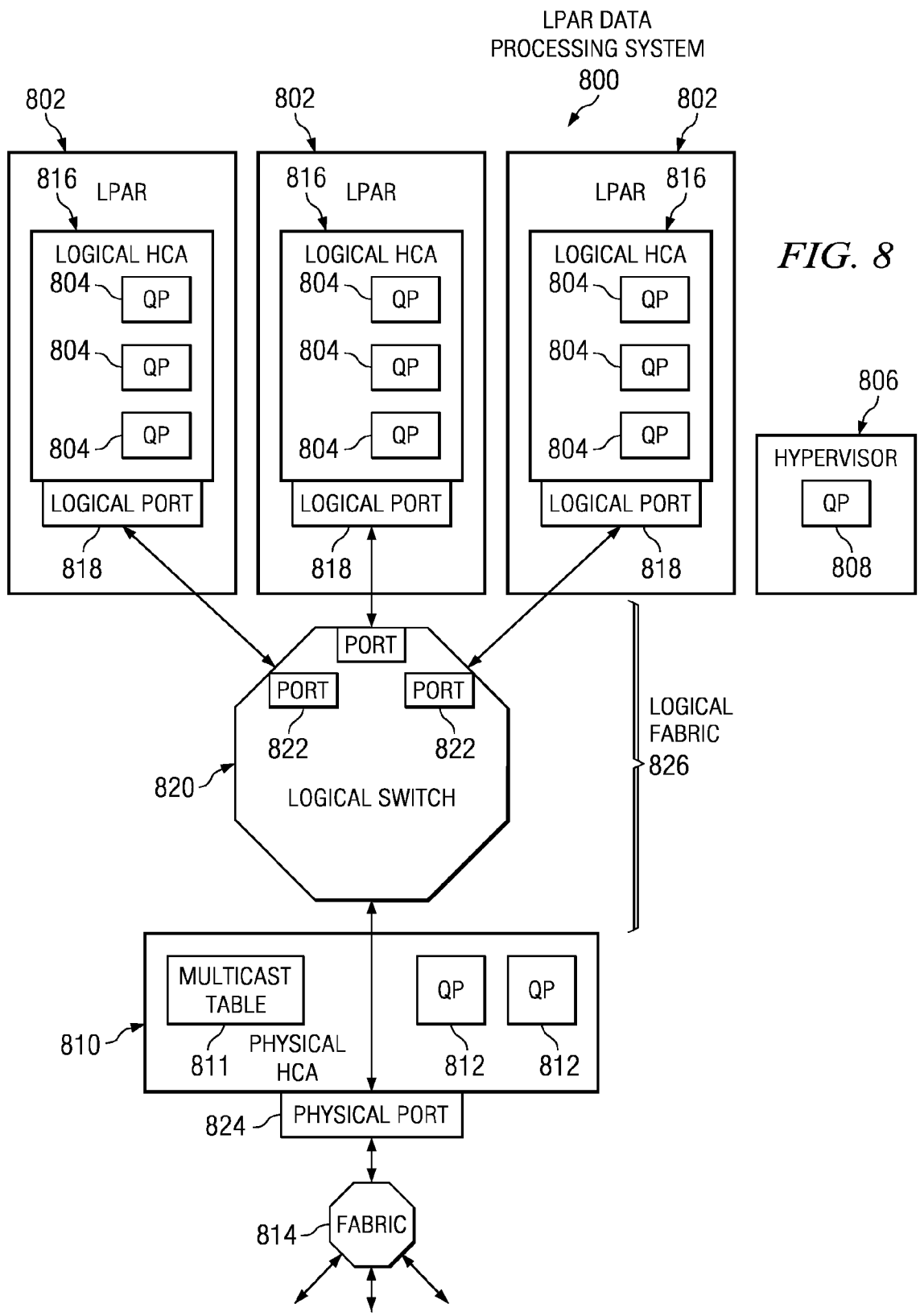

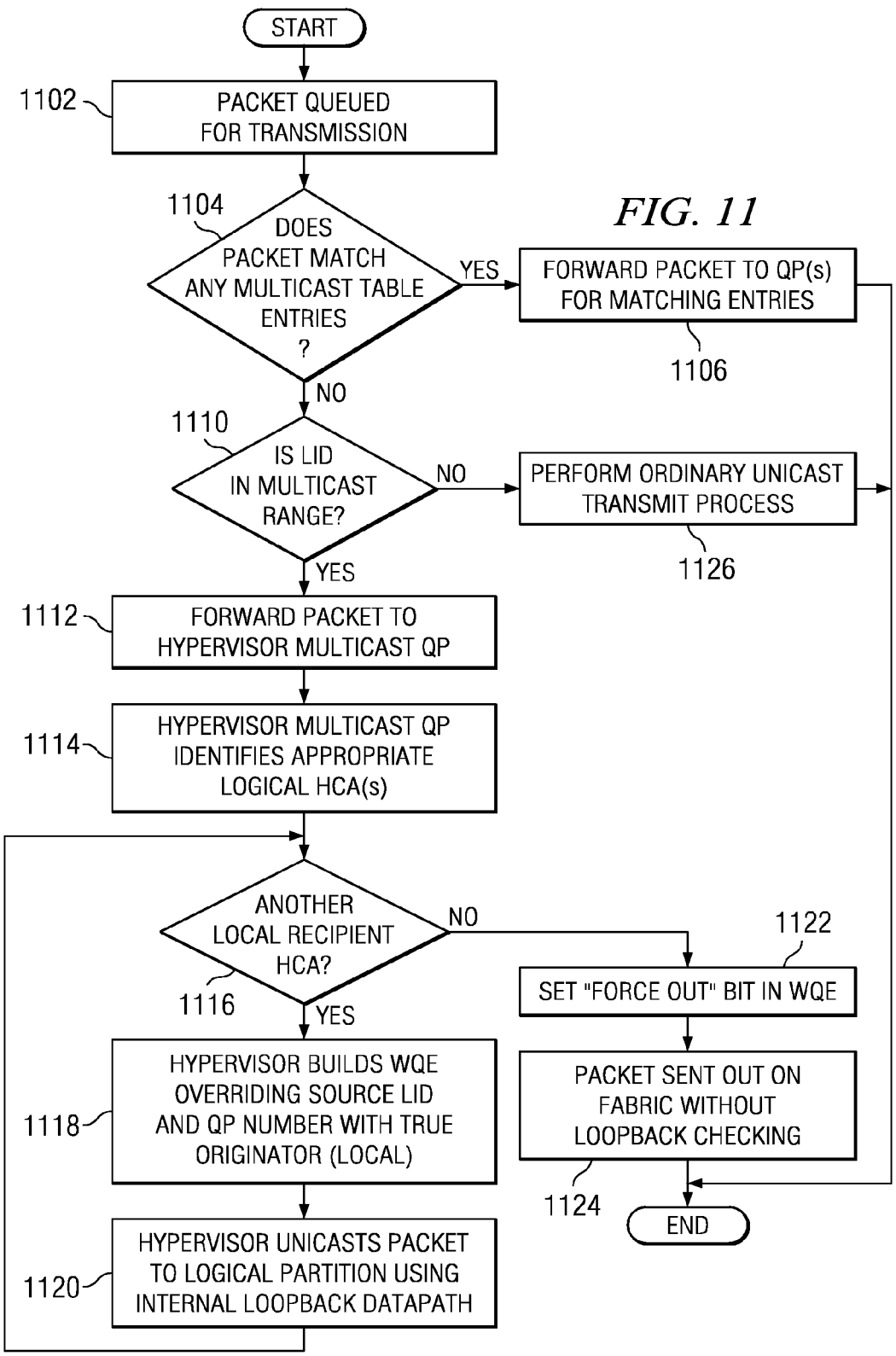

INFINIBAND MULTICAST OPERATION IN AN LPAR ENVIRONMENT

CROSS-REFERENCE TO RELATED APPLICATIONS

The present application is related to commonly-assigned, co-pending U.S. patent application "APPARATUS AND METHOD FOR IMPLEMENTING MULTICAST ON A SYSTEM AREA NETWORK CHANNEL ADAPTER," application Ser. No. 09/925,578, filed Aug. 9, 2001, which is incorporated herein by reference. This application is a continuation of application Ser. No. 10/718,299, filed Nov. 20, 2003, status allowed.

BACKGROUND OF THE INVENTION

1. Technical Field

The present invention is directed to an improved data processing system. More specifically, the present invention is directed to an apparatus and method for implementing multicast on a system area network channel adapter associated with a logically partitioned (LPAR) data processing system, with no visibility to either the Fabric Manager (Subnet Manager) or other Fabric Participants, that LPAR techniques are being employed.

2. Description of Related Art

InfiniBand (IB), which is a form of System Area Network (SAN), defines a multicast facility that allows a Channel Adapter (CA) to send a packet to a single address and have it delivered to multiple ports. Each multicast group is assigned a unique address, and end-nodes that wish to participate in a multicast group do so via a 'Join' process initiated by the candidate participant with the Subnet Manager. The InfiniBand architecture is described in the InfiniBand standard, which is available at http://www.infinibandta.org and also hereby incorporated by reference.

With the InfiniBand architecture, the CA sending the multicast packet may be a Host Channel Adapter (HCA) or a Target Channel Adapter (TCA). A multicast packet is sent to all ports of a collection of ports called a multicast group. These ports may be on the same or different nodes in the SAN. Each multicast group is identified by a unique Local Identifier (LID) and Global Identifier (GID). The LID is an address assigned to a port which is unique within the subnet. The LID is used for directing packets within the subnet. The GID is a 128-bit identifier used to uniquely identify a port on a channel adapter, a port on a router, or a multicast group, across all infiniband subnets. The LID and GID are in the Local Route Header (LRH) and Global Route Header (GRH), respectively, of the IB packet. The LRH is present in all IB packets and is an address used for routing IB packets through switches within a subnet. The GRH is present in IB packets which are either multicast packets, or which are targeted to destinations outside the originator's local subnet and is used as an address for routing the packets when the packets traverse multiple subnets.

An IB management action via a Subnet Management Packet (SMP) is used when a node joins a multicast group, and at that time the LID of the port on the node is linked to the multicast group. A subnet manager then stores this information in the switches of the SAN using SMPs. The subnet manager via SMPs tells the switches the routing information for the various multicast groups, and the switches store that information, so that the switches can route the multicast packets to the correct nodes. When a node is going to send a packet to the multicast group, it uses the multicast LID and GID of the group to which it wants the packet to be delivered. The switches in the subnet detect the multicast LID in the packet's Destination LID (DLID) field and replicates the packet, sending it to the appropriate ports, as previously set up by the subnet manager.

It is the Subnet Manager's job to look at the topology and adjust the multicast forwarding tables of each applicable switch in the fabric such that a member of a multicast group will receive a multicast packet sent to that Multicast Group address.

Within a CA, one or more Queue Pairs (QPs) may be registered to receive a given multicast address. IB allows for the number of QPs within a CA that can be registered for the same address to be only limited by the particular implementation. The registration process is done via the IB verb interface. The verb interface is an abstract description of the functionality of a Host Channel Adapter. An operating system exposes some or all of the verb functionality through its programming interface.

When the CA recognizes a multicast packet, the CA must somehow distribute the packet to all the registered QPs within that CA. This must be done in an efficient manner. How this is done is not specified by the InfiniBand Architecture (IBA).

Commonly-owned co-pending Published U.S. Patent Application No. 2003/003426 of Beukema et al., application Ser. No. 09/925,578, filed Aug. 9, 2001, which is incorporated herein by reference, describes a system for implementing multicast on an Infiniband CA. However, the solution described in the Beukema application does not address the additional complexity associated with a logically-partitioned (LPAR) data processing system.

When implementing LPAR, it is advantageous that each Operating System believes that it has control of a single CA. This is further substantiated by the requirement to maintain transparency to the Subnet Manager and other end-nodes, i.e., neither of these must operate any differently when talking to an LPAR end-node vs. a non-LPAR end-node. In order to achieve this, each LPAR sees a logical CA. The ports on this logical CA are assigned LIDs, just like real ports. In addition, packets coming into the 'real' port of a CA effectively see a logical switch. This logical switch has a set of logical Multicast Forwarding Tables that the Subnet manager will set up.

In an LPAR computing environment, a single data processing system is "virtualized" to multiple software partitions, each representing a different instance of an operating system. An LPAR data processing system thus functions as if it were several separate machines, though the "machines" (generally unbeknownst to each other) share a common hardware platform. LPAR systems are well suited for situations in which multiple computing platforms are needed, but the additional expense and inconvenience of installing and maintaining multiple physical hardware platforms is undesirable. In particular, it would be beneficial if a CA for a SAN such as Infiniband could be shared among multiple partitions of an LPAR system.

SUMMARY OF THE INVENTION

The present invention provides a method, computer program product, and data processing system for providing system-area network (SAN) multicasting functionality in a logically partitioned (LPAR) data processing system in which a channel adapter is shared among a plurality of logical partitions. A preferred embodiment of the present invention allows LPAR "hypervisor" firmware and HCA hardware to share the responsibility for multicast protocol handling and distribution of packets among logical partitions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a diagram illustrating a deployment of a preferred embodiment of the present invention;

FIG. 11 is a flowchart representation of a process of transmitting a multicast packet over a storage area network in accordance with a preferred embodiment of the present invention.

DETAILED DESCRIPTION OF THE PREFERRED EMBODIMENT

Figure 6:
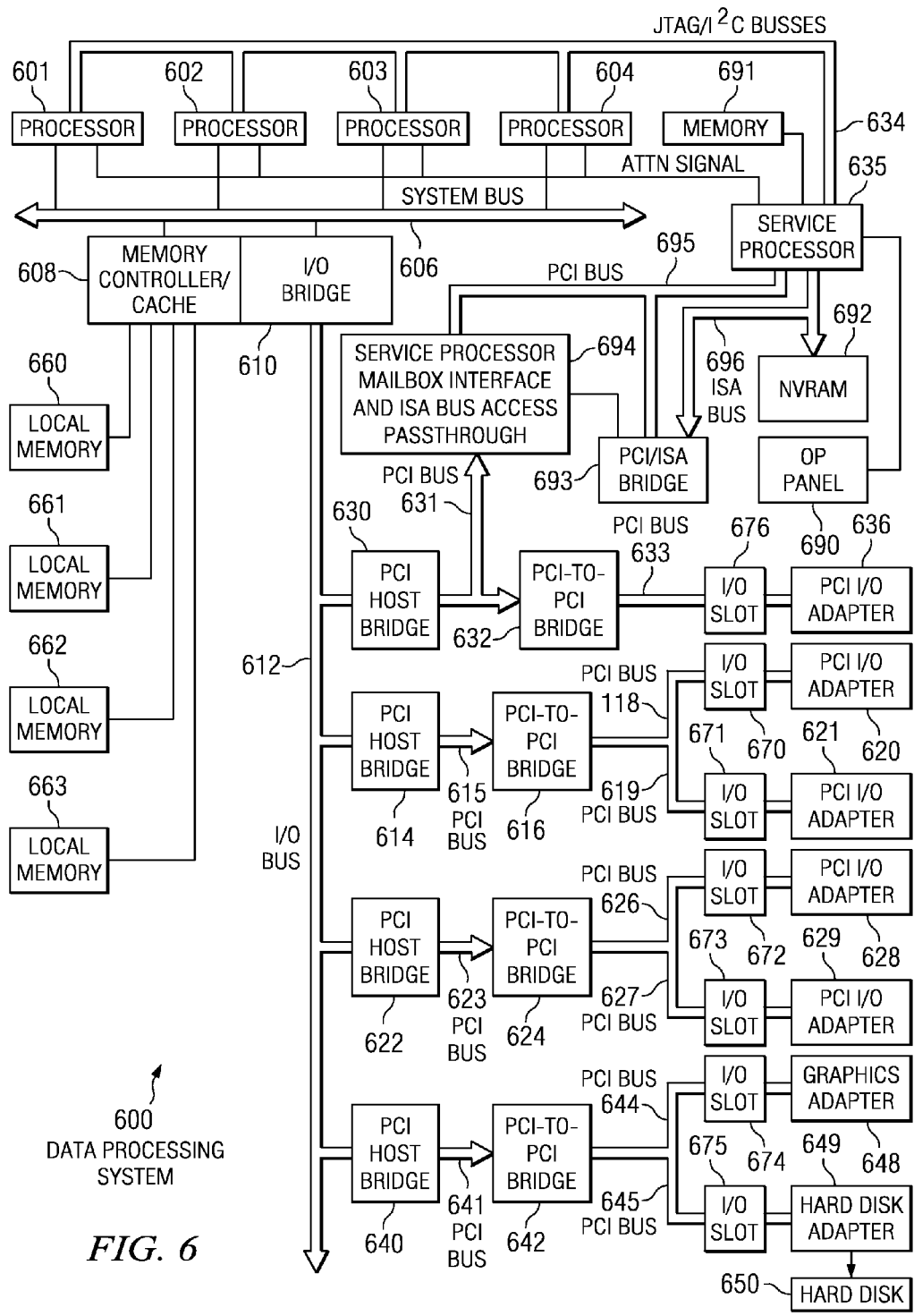
FIG. 6 is a block diagram of a data processing system in which the present invention may be implemented.
Figure 7:
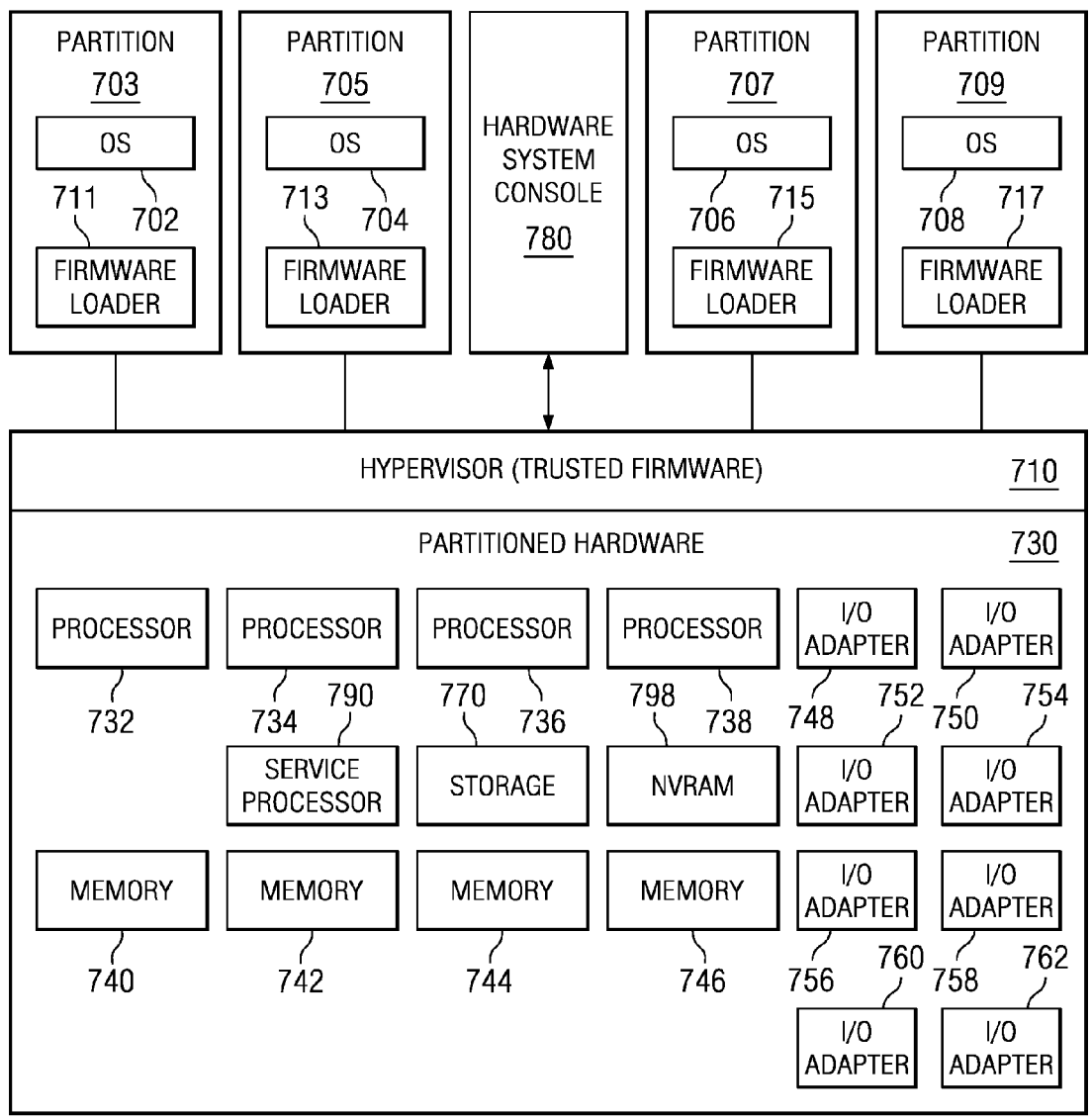
FIG. 7 is a block diagram of an exemplary logical partitioned platform in which the present invention may be implemented.
Figure 10:
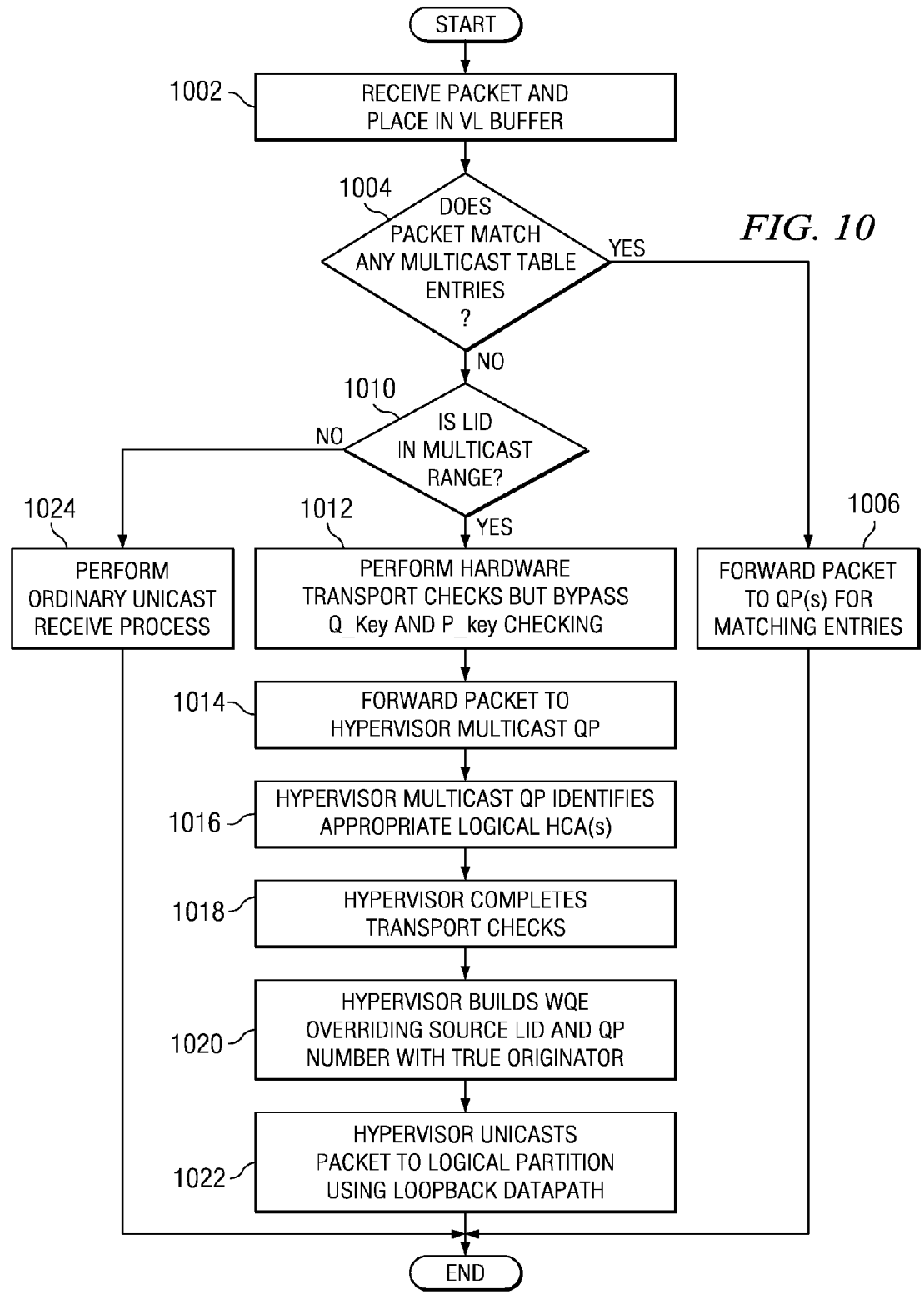
FIG. 10 is a flowchart representation of a process of receiving a multicast packet from a storage area network in accordance with a preferred embodiment of the present invention.

The organization of this Detailed Description is as follows: FIGS. 1-5 describe a process of performing multicast operations in a system area network (SAN) in a non-LPAR computing environment in the manner of the aforementioned Beukema patent application, which is provided for illustration of general principles of its operation that may aid the reader in understanding the operation of a preferred embodiment of the present invention and the technical problems that a preferred embodiment of the present invention overcomes. FIGS. 6-7 illustrate an exemplary LPAR data processing system in which a preferred embodiment of the present invention may be implemented. Finally, FIGS. 8-11 describe a method and apparatus for performing multicast operations in an LPAR data processing system in accordance with a preferred embodiment of the present invention.

Figure 1:
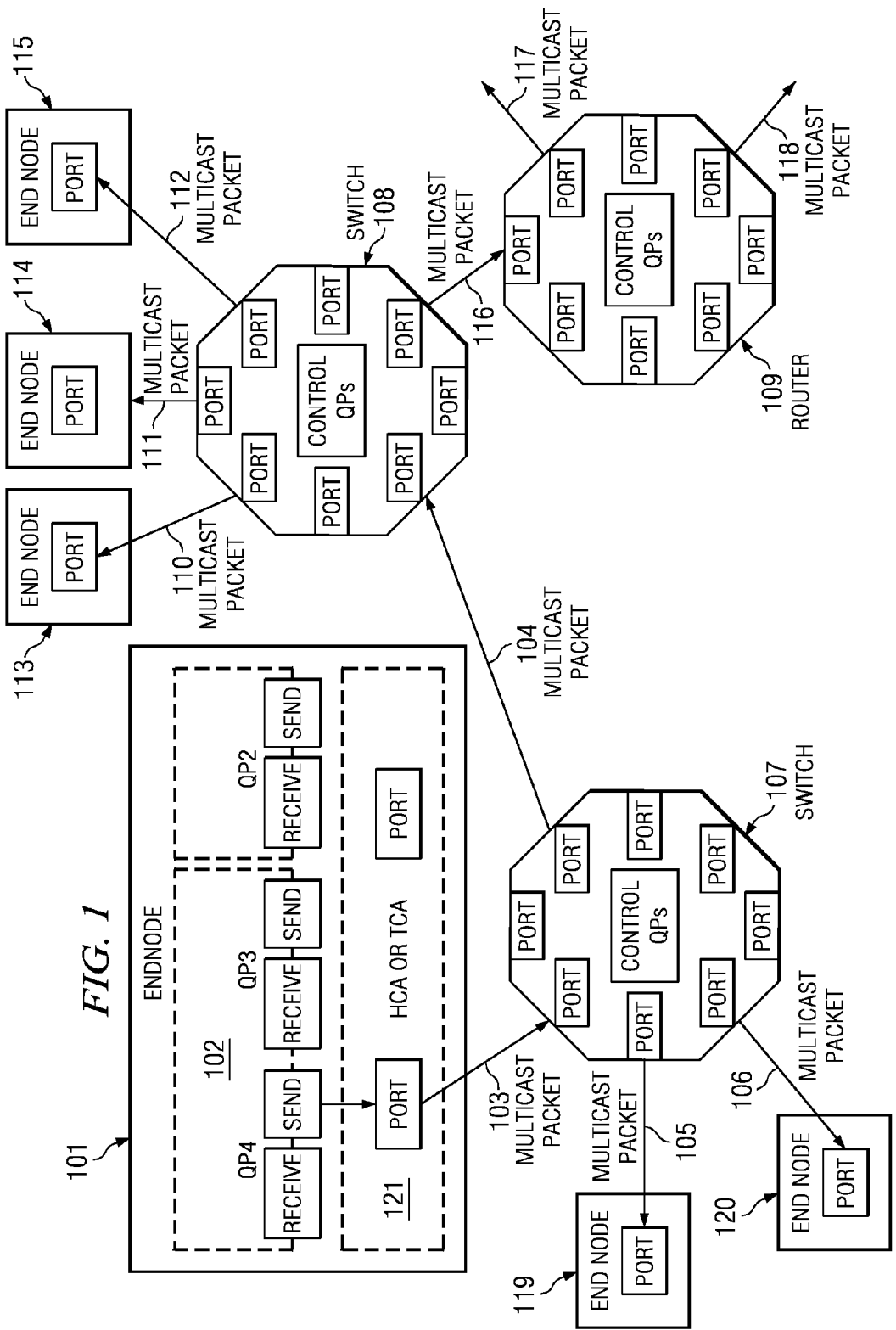
FIG. 1 shows an example of a multicast network in accordance with the present invention.

Referring to FIG. 1, this figure illustrates an example of a system area network (SAN) and the manner by which a multicast packet is routed through the SAN, which hereafter will be referred to as the network. The network is comprised of a plurality of end nodes 101, 113-115, and 119-120. These end nodes are coupled to one another via communication links (not shown), one or more switches 107-108, and one or more routers 109. A switch is a device that routes packets from one link to another of the same Subnet, using the Destination LID (DLID) in the Local Route Header (LRH) of the packet. A router is a device that routes packets between network subnets. An end node is a node in the network that is the final destination for a packet.

In the network shown in FIG. 1, an application in end node 101, which has a QP 102, may queue a "send" work request for a multicast packet into QP 102. When the channel adapter 121, which may be either a host channel adapter (HCA) or target channel adapter (TCA), processes this work request, the channel adapter 121 sends the multicast packet 103 out the port of the channel adapter 121 to switch 107.

Switch 107 decodes the DLID in the inbound packet's LRH to determine target output ports. Switch 107 replicates packet 103 and forwards the replicas to the appropriate output ports based on the DLID and its internal routing tables as packets 104-106.

Packets 105-106 reach end nodes 119-120, respectively, for processing at those end nodes. Packet 104 reaches switch 108 and gets processed in a similar manner to the processing in switch 107, with packets 110-112 and 116 being sent out its ports. Packets 110-112 reach end nodes 113-115, respectively, for processing at those end nodes, Packet 116 reaches router 109 where it decodes the inbound packet's Global Route Header (GRH) Global Identifier (GID) multicast address to determine target output ports. Packet 116 is then replicated by router 109 and forwarded to the output ports as packets 117-118.

Figure 2:
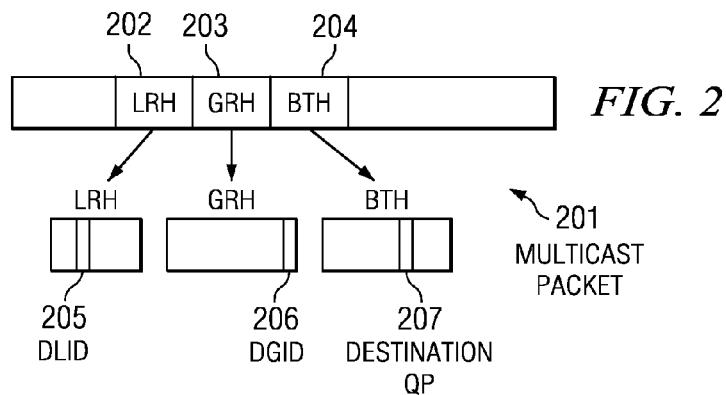
FIG. 2 shows the fields of the IB packet as related to multicast packets in accordance with the present invention.

Referring now to FIG. 2, this figure illustrates an exemplary multicast packet definition. Multicast packet 201 contains several fields including fields 202-204. The Local Route Header (LRH) field 202 and Global Route Header (GRH) field 203 exists in all multicast packets. Base Transport Header (BTH) field 204 exists in all packets except raw data packets. The BTH contains information used for processing the packet at the end node, such as the number of the QP that is to receive the packet, which for multicast is required to be QP #FFFFFF.

Of particular interest to the present invention are DLID subfield 205 of LRH field 202, Destination GID (DGID) subfield 206 of the GRH field 203, and Destination Queue Pair (QP) number subfield 207 of BTH field 204. For multicast packets, the DLID and DGID fields contain the LID and GID for the multicast group to which the multicast packet is targeted, and the Destination QP field contains the number 0xFFFFFF which is a unique QP number identifying this as a multicast operation (as opposed to a specific QP destination within the end node). For multicast packets, the range of LID addresses that are reserved by IB for multicast packets is 0xC000 to 0xFFFE.

It should be noted that, as previously mentioned, the LID is used for routing the packet to the end node. For non-multicast packets, the QP is used for routing within the end node. However, for multicast packets, the method for routing within the end node is different (that is, as defined by the present invention). Therefore, the QP unique number of 0xFFFFFF indicates to the end node that it should not route the packet as "normal" but to use the multicast method of the present invention instead.

Figure 3:
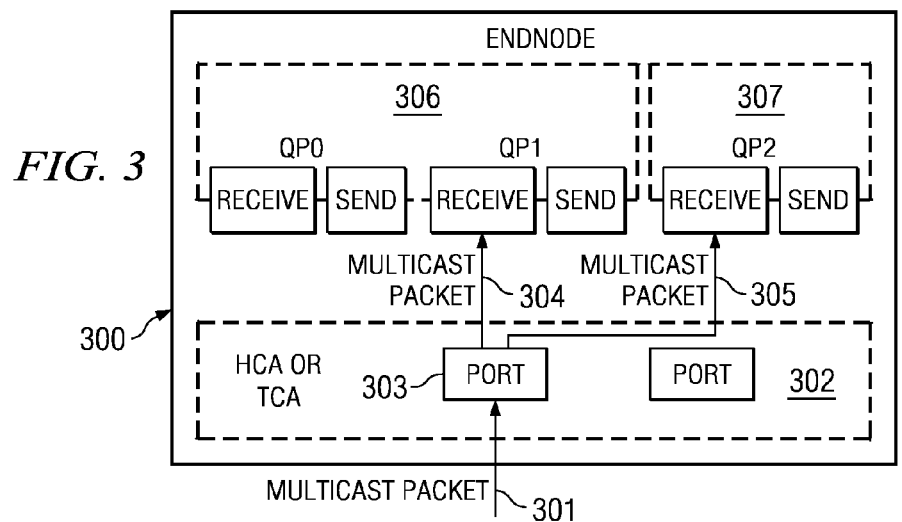
FIG. 3 shows the delivery of a multicast packet within an end node when the end node is different than the source node in a non-LPAR computing environment.

Referring now to FIG. 3, this figure illustrates an example of a packet delivery mechanism within a (non-LPAR) end node, wherein the end node is different from the source node for the packet. As shown in FIG. 3, packet 301 comes into destination end node 300's channel adapter (CA) 302 at port 303. As previously mentioned, the end node channel adapter may be a host channel adapter (HCA) or a target channel adapter (TCA).

CA 302 examines the header information of the multicast packet and makes the determination that this is a multicast packet based on the header information. CA 302 then determines which QPs are part of this multicast group. The CA then replicates the packet as packets 304 and 305 and delivers one internally replicated copy of the packet to each locally managed QP 306-307 participating in the indicated multicast group. As will be described in greater detail hereafter, the present invention provides a mechanism to determine which QPs associated with multiple Logical CAs/Logical Ports should receive the multicast packet 301, i.e. the target QPs, and a mechanism for delivery of the packet to the target QPs.

When the source end node, i.e. the end node that originally generated the multicast packet, contains QPs that are targets of a send operation, the end node must internally replicate the packet and deliver it to each participating QP. Replication occurs within a channel interface and may be performed either in hardware or software.

Figure 4:
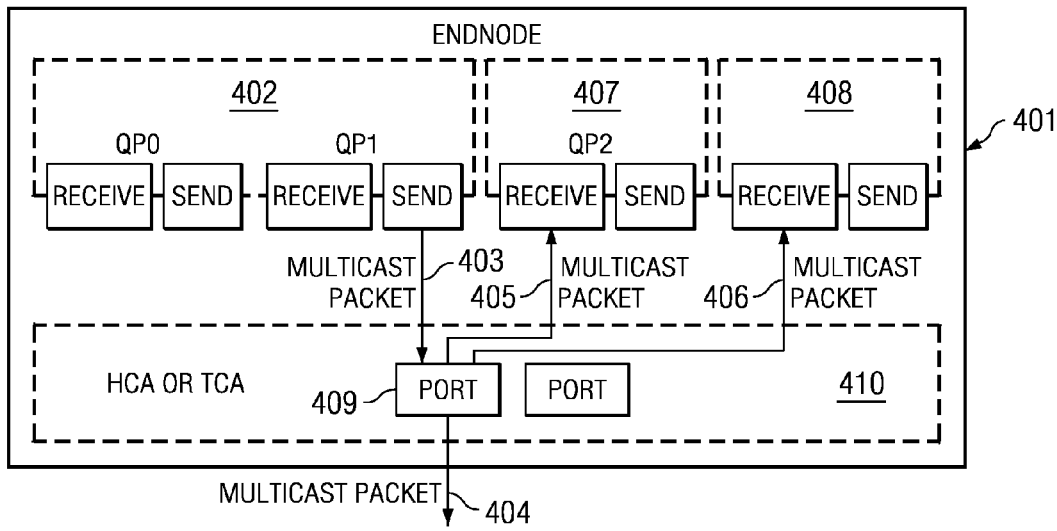
FIG. 4 shows the delivery of a multicast packet within an end node when the end node is the same node as the source node in a non-LPAR computing environment.

Referring now to FIG. 4, this figure illustrates an example of a packet delivery mechanism within an end node, wherein the end node is the same as the source node for the packet. An application in end node 401, which has a QP 402, queues a "send" work request for the multicast packet into QP 402. When CA (HCA or TCA) 410 processes this work request, CA 410 sends multicast packet 404 out port 409 of CA 410.

In addition, CA 410 determines that this same end node contains QPs that are targets of the operation (that is, which are part of the same multicast group). CA 410 makes the determination as to which QPs are part of this multicast group. CA 410 then replicates the packet as packets 405-406 and delivers one internally replicated copy of the packet to each locally managed QP 407-408 participating in the indicated multicast group. The mechanism and method for making the determination as to which QPs receive the multicast packet and the mechanism for making the delivery of the packet to these QPs in accordance with the present invention, is described in greater detail hereafter.

Figure 5:
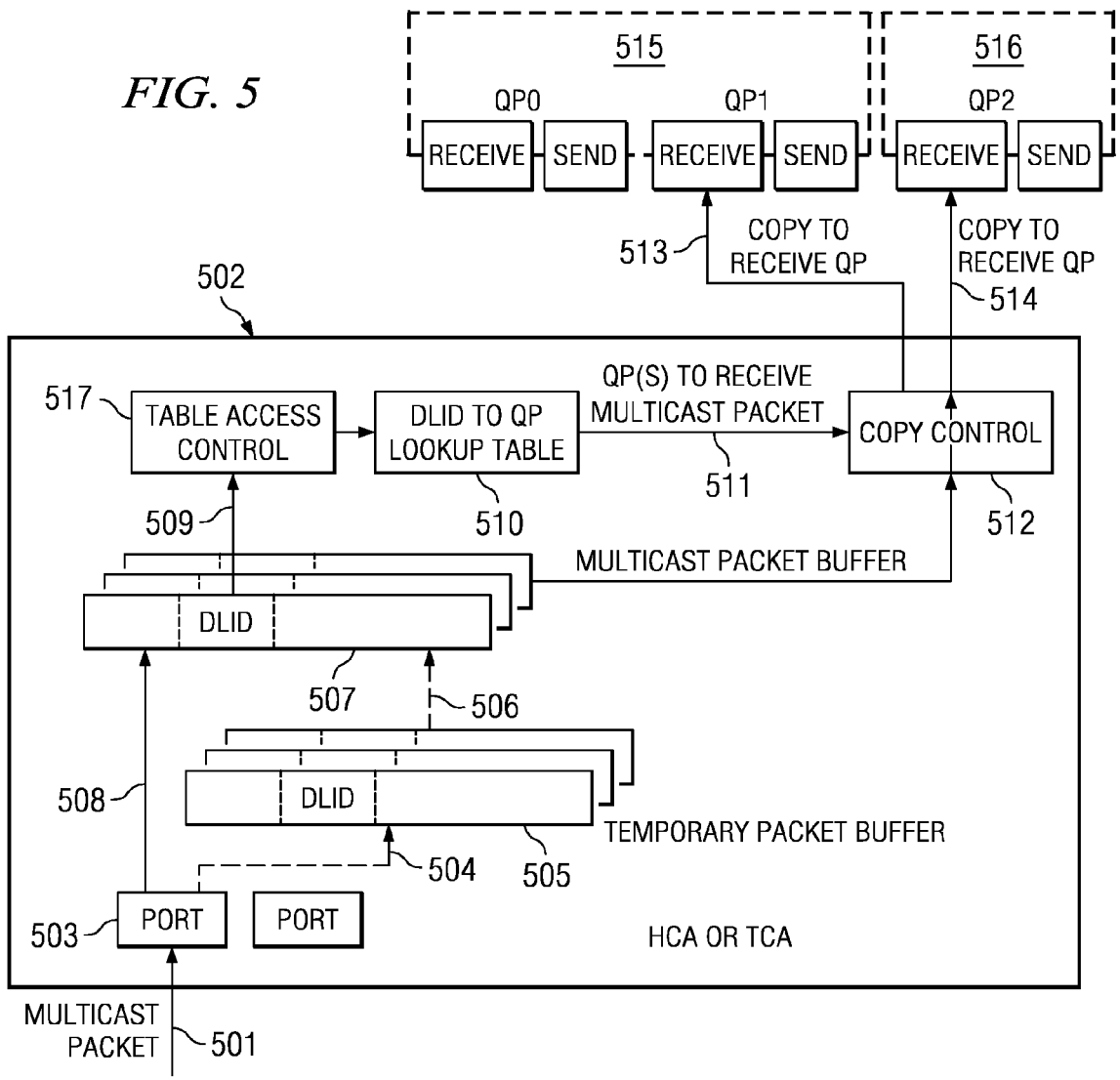
FIG. 5 shows a greater level of detail relative to the delivery of a multicast packet from the receiving port of the CA to the delivery to the receive queue of the CA in a non-LPAR environment.

Referring to now to FIG. 5, this Figure illustrates an exemplary mechanism for distribution of multicast packets to QP destinations in a non-LPAR computing environment. Multicast packet 501 is received by CA 502 at port 503. In one embodiment, port 503 logic moves the packet, as in 504, to a temporary packet buffer 505, as are all other incoming packets. In another embodiment, port 503 logic decodes the packet while it is incoming, determines it is a multicast packet, and transfers it directly to the temporary multicast packet buffer 507, as shown in 508.

If the packet is moved to general temporary packet buffers 505, CA 502 logic decodes the packet, determines the packet to be a multicast packet, and moves it to temporary multicast packet buffers 507, as shown in 506. The determination of the packet as a multicast packet is made by comparing the DLID to an acceptable multicast range of 0xC000 to 0xFFFE and by comparing the number in the destination QP field in the BTH of the received packet to the multicast QP number, 0xFFFFFF.

In either of the two above embodiments, multicast packet 501 is placed in temporary multicast packet buffer 507. In the first embodiment, the decoding of multicast packet 501 is performed by port 503 logic. In the second embodiment, the decoding of multicast packet 501 is performed by CA 502 logic. Once the multicast packet is in a temporary multicast packet buffer 507, it is ready for multicast processing.

It is important to note that if there is an error in the process of bringing multicast packet 501 into CA 502, for example a buffer full condition on temporary buffers 505 or 507, it is defined as acceptable by the IB architecture (IBA) for CA 502 to drop the delivery of the packet due to the unreliable delivery method that is being used for multicast packet delivery. This does not preclude CA 502 from performing some recovery processing to try to avoid dropping the packet.

Once multicast packet 501 is in temporary multicast packet buffer 507, a determination is made as to which QPs are attached to the given multicast group's DLID. Multicast packet 501 is then copied to the appropriate QPs. Since multicast packets have a lower occurrence than regular packets, i.e. non-multicast packets, and because they are defined to be unreliable delivery, which means that they can be dropped without informing the sender, it is possible to perform the following operation in either CA 502's hardware or in the software that is controlling CA 502.

The DLID of the multicast packet in temporary multicast packet buffer 507 is passed, in 509, to a table access control mechanism 517. Table access control mechanism 517 accesses a DLID to QP lookup table 510, determines the QPs that are to receive this packet, if there are any, and passes QP identifiers 511 (which in the exemplary embodiments are numbers but are not limited to such) to copy control mechanism 512. The method used to access the DLID to QP lookup table 510 is different based on the particular embodiment of DLID to QP lookup table 510. Two embodiments of DLID to QP lookup table 510 will be described hereafter, but other embodiments of this table are possible.

Once QP identifiers 511 are passed to copy control 512, copy control 512 copies the packets to the appropriate QPs, as shown in 513-514. In the depicted example, the packets are copied to QPs 515-516. When the copy is complete and the queue entries in QPs 515-516 are marked as valid, copy control 512 removes the multicast packet from temporary multicast packet buffer 507 and marks that buffer as available.

It is important to note that if there is an error in the process of copying the multicast packet from temporary multicast packet buffer 507 to QPs 515-516, for example a QP 515-516 full condition, it is defined as acceptable by the IBA for CA 502 to drop delivery of the packet to one or more QPs due to the unreliable delivery method that is being used for multicast packet delivery. This does not preclude CA 502 from performing some recovery processing to try to avoid dropping the packet.

A preferred embodiment of the present invention provides a method, computer program product, and data processing system for providing system-area network (SAN) multicasting functionality in a logically partitioned (LPAR) data processing system in which a channel adapter is shared among a plurality of logical partitions.

With reference now to FIG. 6, a block diagram of a data processing system in which the present invention may be implemented is depicted. Data processing system 600 may be a symmetric multiprocessor (SMP) system including a plurality of processors 601, 602, 603, and 604 connected to system bus 606. For example, data processing system 600 may be an IBM eServer, a product of International Business Machines Corporation in Armonk, N.Y., implemented as a server within a network. Alternatively, a single processor system may be employed. Also connected to system bus 606 is memory controller/cache 608, which provides an interface to a plurality of local memories 660-663. I/O bus bridge 610 is connected to system bus 606 and provides an interface to I/O bus 612. Memory controller/cache 608 and I/O bus bridge 610 may be integrated as depicted.

Data processing system 600 is a logical partitioned (LPAR) data processing system. Thus, data processing system 600 may have multiple heterogeneous operating systems (or multiple instances of a single operating system) running simultaneously. Each of these multiple operating systems may have any number of software programs executing within it. Data processing system 600 is logically partitioned such that different PCI I/O adapters 620-621, 628-629, and 636, graphics adapter 648, and hard disk adapter 649 may be assigned to different logical partitions. In this case, graphics adapter 648 provides a connection for a display device (not shown), while hard disk adapter 649 provides a connection to control hard disk 650.

Thus, for example, suppose data processing system 600 is divided into three logical partitions, P1, P2, and P3. Each of PCI I/O adapters 620-621, 628-629, 636, graphics adapter 648, hard disk adapter 649, each of host processors 601-604, and memory from local memories 660-663 is assigned to each of the three partitions. In these examples, memories 660-663 may take the form of dual in-line memory modules (DIMMs). DIMMs are not normally assigned on a per DIMM basis to partitions. Instead, a partition will get a portion of the overall memory seen by the platform. For example, processor 601, some portion of memory from local memories 660-663, and I/O adapters 620, 628, and 629 may be assigned to logical partition P1; processors 602-603, some portion of memory from local memories 660-663, and PCI I/O adapters 621 and 636 may be assigned to partition P2; and processor 604, some portion of memory from local memories 660-663, graphics adapter 648 and hard disk adapter 649 may be assigned to logical partition P3.

Each operating system executing within data processing system 600 is assigned to a different logical partition. Thus, each operating system executing within data processing system 600 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P3. Windows XP is a product and trademark of Microsoft Corporation of Redmond, Wash.

Peripheral component interconnect (PCI) host bridge 614 connected to I/O bus 612 provides an interface to PCI local bus 615. A number of PCI input/output adapters 620-621 may be connected to PCI bus 615 through PCI-to-PCI bridge 616, PCI bus 618, PCI bus 619, I/O slot 670, and I/O slot 671. PCI-to-PCI bridge 616 provides an interface to PCI bus 618 and PCI bus 619. PCI I/O adapters 620 and 621 are placed into I/O slots 670 and 671, respectively. Typical PCI bus implementations will support between four and eight I/O adapters (i.e. expansion slots for add-in connectors). Each PCI I/O adapter 620-621 provides an interface between data processing system 600 and input/output devices such as, for example, other network computers, which are clients to data processing system 600.

An additional PCI host bridge 622 provides an interface for an additional PCI bus 623. PCI bus 623 is connected to a plurality of PCI I/O adapters 628-629. PCI I/O adapters 628-629 may be connected to PCI bus 623 through PCI-to-PCI bridge 624, PCI bus 626, PCI bus 627, I/O slot 672, and I/O slot 673. PCI-to-PCI bridge 624 provides an interface to PCI bus 626 and PCI bus 627. PCI I/O adapters 628 and 629 are placed into I/O slots 672 and 673, respectively. In this manner, additional I/O devices, such as, for example, modems or network adapters may be supported through each of PCI I/O adapters 628-629. In this manner, data processing system 600 allows connections to multiple network computers.

A memory mapped graphics adapter 648 inserted into I/O slot 674 may be connected to I/O bus 612 through PCI bus 644, PCI-to-PCI bridge 642, PCI bus 641 and PCI host bridge 640. Hard disk adapter 649 may be placed into I/O slot 675, which is connected to PCI bus 645. In turn, this bus is connected to PCI-to-PCI bridge 642, which is connected to PCI host bridge 640 by PCI bus 641.

A PCI host bridge 630 provides an interface for a PCI bus 631 to connect to I/O bus 612. PCI I/O adapter 636 is connected to I/O slot 676, which is connected to PCI-to-PCI bridge 632 by PCI bus 633. PCI-to-PCI bridge 632 is connected to PCI bus 631. This PCI bus also connects PCI host bridge 630 to the service processor mailbox interface and ISA bus access pass-through logic 694 and PCI-to-PCI bridge 632. Service processor mailbox interface and ISA bus access pass-through logic 694 forwards PCI accesses destined to the PCI/ISA bridge 693. NVRAM storage 692 is connected to the ISA bus 696. Service processor 635 is coupled to service processor mailbox interface and ISA bus access pass-through logic 694 through its local PCI bus 695. Service processor 635 is also connected to processors 601-604 via a plurality of JTAG/I$^2$C busses 634. JTAG/I$^2$C busses 634 are a combination of JTAG/scan busses (see IEEE 1149.1) and Phillips I$^2$C busses. However, alternatively, JTAG/I$^2$C busses 634 may be replaced by only Phillips I$^2$C busses or only JTAG/scan busses. All SP-ATTN signals of the host processors 601, 602, 603, and 604 are connected together to an interrupt input signal of the service processor. The service processor 635 has its own local memory 691, and has access to the hardware OP-panel 690.

When data processing system 600 is initially powered up, service processor 635 uses the JTAG/I$^2$C busses 634 to interrogate the system (host) processors 601-604, memory controller/cache 608, and I/O bridge 610. At completion of this step, service processor 635 has an inventory and topology understanding of data processing system 600. Service processor 635 also executes Built-In-Self-Tests (BISTs), Basic Assurance Tests (BATs), and memory tests on all elements found by interrogating the host processors 601-604, memory controller/cache 608, and I/O bridge 610. Any error information for failures detected during the BISTs, BATs, and memory tests are gathered and reported by service processor 635.

If a meaningful/valid configuration of system resources is still possible after taking out the elements found to be faulty during the BISTs, BATs, and memory tests, then data processing system 600 is allowed to proceed to load executable code into local (host) memories 660-663. Service processor 635 then releases host processors 601-604 for execution of the code loaded into local memory 660-663. While host processors 601-604 are executing code from respective operating systems within data processing system 600, service processor 635 enters a mode of monitoring and reporting errors. The type of items monitored by service processor 635 include, for example, the cooling fan speed and operation, thermal sensors, power supply regulators, and recoverable and non-recoverable errors reported by processors 601-604, local memories 660-663, and I/O bridge 610.

Service processor 635 is responsible for saving and reporting error information related to all the monitored items in data processing system 600. Service processor 635 also takes action based on the type of errors and defined thresholds. For example, service processor 635 may take note of excessive recoverable errors on a processor's cache memory and decide that this is predictive of a hard failure. Based on this determination, service processor 635 may mark that resource for deconfiguration during the current running session and future Initial Program Loads (IPLs). IPLs are also sometimes referred to as a "boot" or "bootstrap".

Data processing system 600 may be implemented using various commercially available computer systems. For example, data processing system 600 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 6 may vary. For example, other peripheral devices, such as optical disk drives and the like, also may be used in addition to or in place of the hardware depicted. The depicted example is not meant to imply architectural limitations with respect to the present invention.

With reference now to FIG. 7, a block diagram of an exemplary logical partitioned platform is depicted in which the present invention may be implemented. The hardware in logical partitioned platform 700 may be implemented as, for example, data processing system 600 in FIG. 6. Logical partitioned platform 700 includes partitioned hardware 730, operating systems 702, 704, 706, 708, and hypervisor (trusted firmware) 710. Operating systems 702, 704, 706, and 708 may be multiple copies of a single operating system or multiple heterogeneous operating systems simultaneously run on platform 700. These operating systems may be implemented using OS/400, which are designed to interface with a hypervisor. Operating systems 702, 704, 706, and 708 are located in partitions 703, 705, 707, and 709.

Additionally, these partitions also include firmware loaders 711, 713, 715, and 717. Firmware loaders 711, 713, 715, and 717 may be implemented using IEEE-1275 Standard Open Firmware and runtime abstraction software (RTAS), which is available from International Business Machines Corporation. When partitions 703, 705, 707, and 709 are instantiated, a copy of the open firmware is loaded into each partition by the hypervisor's partition manager. The processors associated or assigned to the partitions are then dispatched to the partition's memory to execute the partition firmware.

Partitioned hardware 730 includes a plurality of processors 732-738, a plurality of system memory units 740-746, a plurality of input/output (I/O) adapters 748-762, and a storage unit 770. Partitioned hardware 730 also includes service processor 790, which may be used to provide various services, such as processing of errors in the partitions. Each of the processors 732-738, memory units 740-746, NVRAM storage 798, and I/O adapters 748-762 may be assigned to one of multiple partitions within logical partitioned platform 700, each of which corresponds to one of operating systems 702, 704, 706, and 708.

Partition management firmware (hypervisor) 710 performs a number of functions and services for partitions 703, 705, 707, and 709 to create and enforce the partitioning of logical partitioned platform 700. Hypervisor 710 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 710 allows the simultaneous execution of independent OS images 702, 704, 706, and 708 by virtualizing all the hardware resources of logical partitioned platform 700.

Operations of the different partitions may be controlled through a hardware management console, such as console 764. Console 764 is a separate data processing system from which a system administrator may perform various functions including reallocation of resources to different partitions.

FIG. 8 is a diagram illustrating a deployment of a preferred embodiment of the present invention. LPAR data processing system 800 hosts a number of logical partitions (LPARs) 802. Each of LPARs 802 may support one or more Infiniband queue pairs (QPs), such as QP 804. LPAR data processing system 800 also supports an Infiniband physical host channel adapter (HCA) 810, which is shared among LPARs 802 and which interfaces LPAR data processing system 800 to external switching fabric 814. HCA 810 supports its own set of QPs, including QP 812.

Each LPAR 802 includes a logical HCA 816, each logical HCA 816 having a logical port 818 through which the partitions interface with logical switch 820. Logical switch 820 includes a plurality of ports 822 for interfacing with the logical partitions. Logical switch 820 also interfaces with physical port 824, which itself interfaces with external fabric 814. Logical ports 818 and logical switch 820 comprise the logical fabric 826 shown between LPARs 802 and physical HCA 810.

Hypervisor 806, which is the supervisory firmware in charge of managing LPARs 802, also provides an interface from HCA 810 to LPARs 802. Hypervisor 806 supports a QP 808, which is used to relay packets between the LPARs 802 and HCA 810. In effect, the hypervisor and its QP 808 perform the function of a switch's Multicast Forwarding table 811. In this preferred embodiment, hypervisor 806 assumes some of the protocol handling responsibilities of HCA 810 in particular situations in which multicast packets are received for delivery to any of LPARs 802. The Hypervisor assumes some of the protocol checking because it needs to handle these multicast packets on behalf of multiple logical CAs/logical ports, thus the flexibility of software is advantageous. HCA 810 maintains a multicast table 811, which contains information on the various multicast groups to which LPAR data processing system 800 may belong (or, more specifically, to which any Logical Ports 818 of Logical HCAs 816 may belong).

In particular, a preferred embodiment of the present invention provides a number of mechanisms that, in selected cases, transfer the responsibility for certain protocol checking operations from HCA 810's hardware to trusted firmware or operating system code, such as hypervisor 806. At the same time, for packets not associated with multicast, the hardware retains the protocol checking responsibility, thus maintaining significantly better overall performance than if the total responsibility for protocol checking were transferred to firmware or software. Further, the invention provides hardware assists to improve the performance of the checking that is transferred to firmware of software code. A number of these features are listed below:

a. A scalable hardware multicast table (e.g., multicast table 811) that can be sized to fit hardware implementations, but that can also be extended to support more multicast groups by selectively employing hooks to hypervisor firmware (e.g., hypervisor 806) or a trusted operating system.

b. Means to override Source Logical Identifier (SLID) and Source Queue Pair Number (Source QP#), normally supplied by the hardware based upon the originator's identity, in a Work Queue Entry (WQE) to perform transparent packet replication and retransmission. This allows trusted code managing a QP to set the SLID and Source QP# of a packet to a value other than its own.

c. An option to disable hardware Queue Key (Q_Key) checking to allow a QP to operate on multicast flows from more than one multicast group.

d. Techniques that enable the checking of Partition Keys (P_Keys) against a variety of valid P_Keys or to disable P_Key checking. Both allow a OP to operate on multicast flows from more than one multicast group.

e. Detection of local recipients of multicast packets supported by the same hardware.

f. The use of internal loopback data paths to aid in packet replication and delivery of multicast packets destined to recipients supported by the adapter.

g. A 'Force Out' mechanism that disables internal loopback checking and allows direct transmission of a packet onto a fabric.

Figure 9:
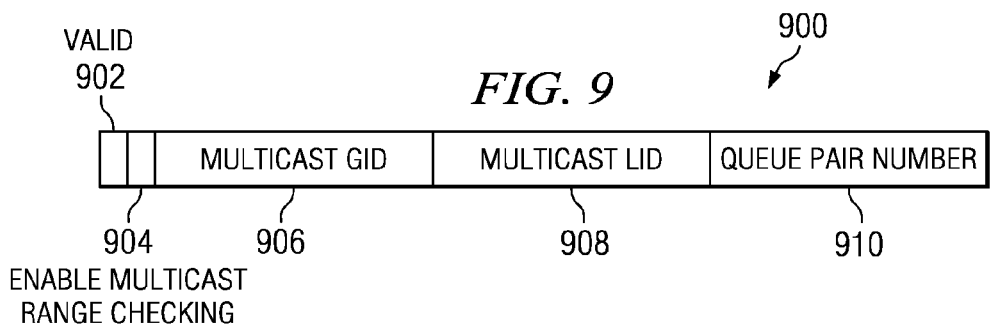
FIG. 9 is a diagram of an entry in a host channel adapter multicast table in accordance with a preferred embodiment of the present invention.

FIG. 9 is a diagram of an entry 900 in a host channel adapter multicast table (e.g., multicast table 811) in accordance with a preferred embodiment of the present invention. Each entry 900 contains two control bits: a "valid" bit 902 that indicates whether the entry is valid, and a "enable multicast range checking" bit 904. If bit 904 is set to 1, HCA hardware (HCA 810) will check to see if the DLID (Destination Local Identifier) of received and transmitted packets falls within the multicast address range for this protocol. If so, the hardware will transfer responsibility for certain requirements of the protocol to trusted firmware or operating system code (e.g., hypervisor 806). The Multicast Group Identifier (MGID 906) and Multicast Local Identifier (MLID 908) are the Infiniband address components that uniquely define a Multicast Group. QP number 910 holds the number of the QP that HCA 810 associates with this multicast group. QP number 910 is the QP that will receive incoming packets.

HCA 810 uses multicast table 811 to deliver an incoming packet to a QP based on associating the packet's MLID and MGID to a valid table entry's MLID and MGID. After performing all required transport checks, HCA 810 delivers the incoming packet to the QP indicated by the matching multicast group table entry (QP number 910). Hypervisor software is responsible for setting up the table based on the appropriate Management Datagrams (MADs) sent to the Logical Switch that instructs the switch how to setup the switch's multicast forwarding table. Multicast table 811 can be used in one of three ways:

1. The QP represented by QP number 910 may be owned by trusted hypervisor code and serve multiple LPARs supported by logical HCAs with associated logical ports behind a single physical port.

2. The QP represented by QP number 910 may be owned by trusted operating system code and serve multiple applications in an LPAR.

3. The QP represented by QP number 910 may be directly owned by an application in a single LPAR.

Multicast table 811 can vary in size from a single entry to a very large number of entries, depending only on hardware size limitations of HCA 810.

To maintain a high degree of scalability, a preferred embodiment of the present invention includes a feature in which one entry of the table supports the capability of setting "enable multicast range checking" bit 904. When "enable multicast range checking" bit 904 is set for an entry in multicast table 811, HCA 810 will recognize any incoming multicast packet not present in other table entries (based on that packet's being in the multicast address range for the protocol, namely 0xC000-0xFFFE in the case of Infiniband) and routes the packet to the QP specified in QP number 910 for that entry. In such a case, HCA 810 ignores the MGID 906 and MLID 908 fields. The QP specified in this special table entry must be owned by trusted hypervisor code (i.e., hypervisor 806). Hypervisor 806 must first determine if any QPs supported by any Logical HCA/Logical Port on behalf of an LPAR, are members of the incoming packet's Multicast Group. If so, it then must perform any disabled transport level checks normally performed by HCA 810 (e.g., Q_key and/or P_key checking) to determine if the packet in question is a valid multicast packet destined for a recipient in LPAR data processing system 800. If not, the packet is silently dropped.

The application of techniques a.-g., described above, is now illustrated in flowchart form with respect to processes of receiving and transmitting, respectively, Infiniband multicast packets in a preferred embodiment of the present invention. In both of these examples, we assume that multicast table 811 contains an entry in which "enable multicast range checking" bit 904 is set to 1. We turn now to FIG. 10, a flowchart representation of a process of receiving a multicast packet from a system area network in accordance with a preferred embodiment of the present invention. A packet is received by HCA 810 and placed in a virtual lane (VL) buffer (step 1002). If the packet matches any of the entries in multicast table 811 (step 1004: yes). Then the hardware transport checks are performed (step 1005). Then the packet is forwarded to the QP specified in the matching entry or entries (step 1006). If not (step 1004: No), then a determination is made as to whether the local identifier (LID) for this packet is within the protocol multicast range (step 1010). If not (step 1010: No), then the packet is a unicast packet and is handled through the normal unicast reception process (step 1024).

If the packet is a multicast packet, however (step 1010: Yes), PCA 810 performs some, but not all hardware transport checks in the protocol (step 1012). Specifically, Q_key and P_key checking are bypassed at this stage. Next, the packet is forwarded to a special multicast QP maintained by hypervisor 806 (step 1014). Hypervisor 806's multicast QP then identifies the appropriate logical HCA(s) of the recipient LPARs to forward the packet to (step 1016), and then completes the bypassed transport checks (step 1018). Hypervisor 806 builds a work queue element (WQE), but overriding the source local identifier (SLID) and source QP number (which would normally be those of hypervisor 806's multicast QP) with those of the true originator of the packet to be forwarded (step 1020). Hypervisor 806 then unicasts the packet to the appropriate LPARs using an internal loopback datapath to complete the process (step 1022).

FIG. 11 is a flowchart representation of a process of transmitting a multicast packet over a system area network in accordance with a preferred embodiment of the present invention. A packet is queued for transmission by HCA 810 (step 1102). If the packet matches any entries in multicast table 811 (step 1104: Yes), then the packet is forwarded by HCA 810 to the QPs specified by the matching entry or entries (step 1106). If not (step 1104: No), a determination is then made as to whether the local identifier (LID) of the packet is in the multicast range for the protocol (step 1110). If the LID is not in the multicast range for the protocol (step 1110: No), then the packet is intended for unicast transmission and the normal unicast transmission process can be carried out by HCA 810 (step 1126).

If, however, the LID is in the multicast range (step 1110: Yes), then the packet is forwarded to hypervisor 806's multicast QP (step 1112). Hypervisor 806's multicast QP then identifies the appropriate logical HCA(s) (if any) in the LPAR data processing system to which the packet should be forwarded (step 1114). A "while" loop iterates over these local logical HCAs (step 1116). At each loop iteration (step 1116: Yes), hypervisor 806 builds a work queue element (WQE), but overriding the source local identifier (SLID) and source QP number (which would normally be those of hypervisor 806's multicast QP) with those of the true originator of the packet to be forwarded (step 1118). Hypervisor 806 then unicasts the packet to the appropriate LPARs using an internal loopback datapath (step 1120).

After all local logical HCAs have been iterated over (step 1116: No), a new WQE is generated using the original multicast DLID (destination local identifier) and GID (group identifier) and a special "Force Out" bit in the WQE is set to 1 (step 1122). This packet is sent to HCA 810, which interprets the "Force Out" bit to mean that the packet should be "forced out" onto network fabric 814 (step 1124).

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product stored in a computer-readable recordable-type medium comprising functional descriptive material that, when executed by a computer, causes the computer to perform actions that include:

receiving a packet in a host channel adapter for a system area network, wherein the packet is received by the host channel adapter from an application on a host associated with the host channel adapter and the packet is received by the host channel adapter for the purpose of transmitting the packet over the system area network, and wherein in response to the host channel adapter's receiving the packet and in response to an associated Force Out bit in a work queue element being set to a first value, the host channel adapter attempts to transmit the packet to local logical host channel adapters, and in response to the channel adapter's receiving the packet and in response to the associated Force Out bit in the work queue element being set to a second value that is distinct from the first value, the host channel adapter transmits the packet over a system area network fabric, and wherein the host channel adapter is shared among a plurality of logical partitions within a logically partitioned data processing system, and wherein each logical partition within the plurality of logical partitions includes a logical host channel adapter having a logical port;

checking a multicast table in the host channel adapter to determine if a matching entry exists in the multicast table for information in the packet, wherein the multicast table contains information on multicast groups to which logical ports of logical host channel adapters belong; and forwarding the packet to trusted software in response to a determination that the packet is intended for multicasting and that no matching entry exists in the multicast table for the information in the packet, wherein the trusted software forwards the packet to one or more appropriate recipient logical partitions within the plurality of logical partitions.

2. The computer program product of claim 1, wherein at least one protocol checking operation of the host channel adapter is bypassed for the purpose of forwarding the packet to the trusted software.

3. The computer program product of claim 2, wherein the trusted software completes the at least one protocol checking operation on the forwarded packet.

4. The computer program product of claim 3, wherein the at least one protocol checking operation includes at least one of queue key (Q_key) checking and partition key (P_key) checking.

5. The computer program product of claim 1, wherein the trusted software includes at least one of a hypervisor and an operating system.

6. The computer program product of claim 1, wherein the packet is received by the host channel adapter from a system area network fabric.

7. A data processing system comprising:

a bus system;

a storage device connected to the bus system, wherein the storage device includes a set of instructions; and a processing unit connected to the bus system, wherein the processing unit executes the set of instructions for:

receiving a packet in a host channel adapter for a system area network, wherein the packet is received by the host channel adapter from an application on a host associated with the host channel adapter and the packet is received by the host channel adapter for the purpose of transmitting the packet over the system area network, and wherein in response to the host channel adapter's receiving the packet and in response to an associated Force Out bit in a work queue element being set to a first value, the host channel adapter attempts to transmit the packet to local logical host channel adapters, and in response to the channel adapter's receiving the packet and in response to the associated Force Out bit in the work queue element being set to a second value that is distinct from the first value, the host channel adapter transmits the packet over a system area network fabric, and wherein the host channel adapter is shared among a plurality of logical partitions within a logically partitioned data processing system, and wherein each logical partition within the plurality of logical partitions includes a logical host channel adapter having a logical port;

checking a multicast table in the host channel adapter to determine if a matching entry exists in the multicast table for information in the packet, wherein the multicast table contains information on multicast groups to which logical ports of logical host channel adapters belong; and for forwarding the packet to trusted software in response to a determination that the packet is intended for multicasting and that no matching entry exists in the multicast table for the information in the packet, wherein the trusted software forwards the packet to one or more appropriate recipient logical partitions within the plurality of logical partitions.

8. The data processing system of claim 7, wherein at least one protocol checking operation of the host channel adapter is bypassed for the purpose of forwarding the packet to the trusted software.

9. The data processing system of claim 8, wherein the trusted software completes the at least one protocol checking operation on the forwarded packet.

10. The data processing system of claim 9, wherein the at least one protocol checking operation includes at least one of queue key (Q_key) checking and partition key (P_key) checking.

11. The data processing system of claim 7, wherein the trusted software includes at least one of a hypervisor and an operating system.

12. The data processing system of claim 7, wherein the packet is received by the host channel adapter from a system area network fabric.

* * * * *